United States Patent [19]

Zweig

[11] Patent Number: 4,903,743
[45] Date of Patent: Feb. 27, 1990

[54] WOODWORKING MACHINE

[75] Inventor: Siegfried Zweig, Oberkochen, Fed. Rep. of Germany

[73] Assignee: Okma Oberkochener Maschinen GmbH, Oberkochen, Fed. Rep. of Germany

[21] Appl. No.: 198,362

[22] Filed: May 25, 1988

[30] Foreign Application Priority Data

May 26, 1987 [DE] Fed. Rep. of Germany ....... 3717731

[51] Int. Cl.$^4$ ........................... B27C 9/00; B27F 5/00; B27F 1/16
[52] U.S. Cl. ..................................... 144/3 R; 144/82; 144/84; 144/198 R; 144/203; 144/368; 144/379
[58] Field of Search ................ 144/1 R, 3 R, 39, 82, 144/84, 203, 198, 367, 368, 379

[56] References Cited

U.S. PATENT DOCUMENTS

| | | | |
|---|---|---|---|
| 2,343,097 | 2/1944 | Taylor | 144/84 |
| 3,295,570 | 1/1967 | Olbrich | 144/3 R |
| 4,098,310 | 7/1978 | Sanford et al. | 144/30 |
| 4,331,191 | 5/1982 | Buttner | 144/3 R |
| 4,450,881 | 5/1984 | Buttner | 144/84 |

*Primary Examiner*—W. Donald Bray
*Attorney, Agent, or Firm*—Wells & White

[57] ABSTRACT

A woodworking machine comprising at least one tenoning-and-mortizing spindle associated with a length-cutting device and a pivoting roller table consisting of a roller carriage and an associated table plate receiving the workpiece and pivoting about said carriage around a vertical axis is designed in such a manner that in spite of the pivotability of the roller table or of its table plate the same length of the oblique window wood will be obtained in any angular position of said roller table or its table plate. For that purpose the invention provides that the vertical pivot axis of the roller table or its table plate be located on the straight line of intersection between two parallel planes of which one is parallel to the direction of advance of the roller table and includes that side of the saw blade of the length-cutting device which faces the workpiece, whereas the other plane includes one of the two longitudinal sides of the workpiece, the two planes subtending an angle >90° on that side of the first plane facing the roller table on this side of the workpiece (of the window wood).

6 Claims, 1 Drawing Sheet

WOODWORKING MACHINE

BACKGROUND OF THE INVENTION

The invention concerns a woodworking machine with at least one tenon-and-mortise cutting spindle to which is associated a length-cutting device and a pivotable roller table, this roller table consisting of a roller carriage and a table plate receiving the workpiece and pivotable about a vertical axis.

Woodworking machines of this kind are used mostly to provide the ends of those window woods with tenons and mortises that are used in making rectangular or square windows. Accordingly the window woods are made to pass by means of the roller table along the tools of the tenoning-and-mortising spindle in such a way that the woods' longitudinal axes are at right angle to the direction of advance. In this manner the woods are first cut to length—usually by a length-cutting saw—orthogonally to their longitudinal axis, and then they are equipped with tenons and mortises which also extend orthogonally to their longitude.

Roller tables already are known of which the plate is pivotable in the horizontal plane about a vertical axis in the vicinity of the roller table, whereby the ends of the window woods can be made to pass along the length-cutting saw and the tools of the tenoning-and-mortising spindle at an angle other than 90°. This means that the ends of the window woods are cut obliquely and also that the tenons and mortises are oblique.

As a rule the subsequent removal, especially one to the lengthwise profiling equipment, will require that following the tenoning and mortising, the window wood be aligned again, that is, that it be moved into a position wherein its longitudinal axis is orthogonal to the direction of advance of the roller table.

The known machinery suffers from the drawback that because of the position of the pivot axis, a rotation of the roller table or its plate involves moving the window wood end pointing toward the tools closer to or farther from the tools depending on the direction of pivoting. As a result, where the cut surfaces must have different angles, for instance for triangular windows, the clamping of the window wood on the roller table must be undone and the window wood length must be aligned again before being obliquely cut to length again. This new clamping and especially the new length determination is laborious and furthermore inaccurate because the obliqueness of the window wood interfere with the tools easily determining the length.

SUMMARY OF THE INVENTION

Accordingly it is the purpose of the invention to so design a woodworking machine of the initially cited kind that in spite of the roller table, or its plate being pivoted into all angular positions, always the same length of the obliquely laid window wood shall be produced or retained.

This problem is solved by the invention in that the vertical pivot axis of the roller table or its plate is located on the straight intersection line of two perpendicular planes, one of which is parallel to the direction of advance of the roller table and includes that side of the saw blade of the length-cutting device facing the roller table or the workpiece, whereas the one of the two vertical longitudinal sides of the workpiece is located in the other plane, the two planes subtending an angle larger than 90° on that side of the first plane facing the roller table on this side of the workpiece (ie the window wood).

This design makes it possible to pivot the roller table after the wood has been cut to length without having to undo the clamping as was required heretofore on account of changes in length. Following cutting to length, that is, also when cutting obliquely, the length-determining tip of the workpiece coincides with the vertical pivot axis of the roller table as seen in topview, whereby the table plate of the roller table can be pivoted together with the workpiece around the tip and thereby around the pivot axis. Tool parts cannot project beyond the plane in which is located that side of the saw blade which faces the workpiece.

The pivot-shaft position determined by the invention entails that the roller table cannot mechanically form that pivot axis. In particular the invention precludes a central spindle, a vertical shaft or the like. To achieve a pivoting motion about the vertical pivot axis, the invention instead provides that the mutually facing surfaces of the table plate and of the roller carriage be provided with mutually engaging components of a circular guide means. The radius of the guide means corresponds to the distance between guide means and pivot axis, in other words, the pivot axis is at the center of the guide.

The guide means may be designed in known manner, in particular one component may be of trapezoidal cross-section to make possible precise matching to the other component.

In particular the matching component of the guide may comprise roller bearings with cylindrical needles allowing low-friction rotation. Moreover slide bearing or roller bearing sections may be provided that are displaceable toward the guide to make the fit accurately adjustable to this extent too.

BRIEF DESCRIPTION OF THE DRAWING

Below the invention is discussed comprehensively in relation to illustrative embodiments shown in the drawing.

DESCRIPTION OF THE PREFERRED EMBODIMENT

Figure 1:
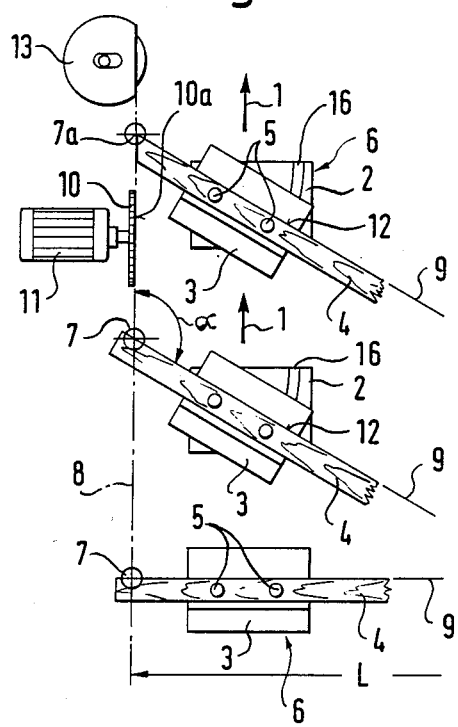
FIG. 1 is a schematic operational sequence for one embodiment of the woodworking machine of the invention.

FIG. 1 shows a roller carriage 2 moving on (omitted) guides in the direction of advance (arrows 1) and bearing a table plate 3 pivoting relative to it and serving to receive a workpiece to be processed, in particular a window wood 4 which is clamped by clamp units 5 onto the table plate 3. The roller table is denoted as a whole by 6.

The roller table plate 3, pivots about a vertical pivot axis 7 located on the straight line of intersection between a first vertical plane 8 and a second vertical plane 9. The first vertical plane 8 extends in the direction of advance 1 and coincides with the side 10a of a saw blade 10 of a length-cutting saw 11, where this side 10a faces the roller table 6, ie the workpiece 4. The second vertical plane 9 is located in such a way that it includes one of the two vertical longitudinal sides 12 of the window wood 4. The two planes 8 and 9 subtend an angle α>90° on the side facing the roller table 6 on this side of the window wood 4.

The length-cutting saw 11 is followed in the embodiment shown by a tenoning-and-mortising spindle 13 so that the end cut to size of the window wood facing it can be provided with tenon and mortise.

The described machinery operates as follows:

The window wood 4 shall be provided with an oblique cut at its end facing the length-cutting saw 11, and possibly also with tenon and mortise, while being in its normal, clamped position shown at the bottom of FIG. 1. This lower clamping position of FIG. 1 entails a specific and predetermined length L which as regards the length-cutting about to take place may be the first or also the last cut.

In order to put the window wood 4 into the oblique position suitable for the miter or oblique cut, the table plate 3 is pivoted about the vertical pivot axis 7 as shown at the center of FIG. 1, the length L, namely the distance between the pivot axis 7 and the rear end of the window wood remaining constant. While in this oblique position, the window wood end is made to move against the saw blade 10 of the length-cutting saw 11 and is cut off accordingly, whereby the tip 7a forming the control length is being formed. By further motion, the window wood end facing the tools is provided with tenon and mortise by the tenoning-and-mortising spindle 13.

To make possible pivoting about the pivot axis 7 located outside the roller table 6, the mutually facing surfaces 3a and 2a of the table plate 3 and of the roller carriage 2 (FIGS. 5 and 6) are equipped with the mutually engaging components 14 and 15 (FIG. 5) of an arcuate guide 16 of which the radius R (FIG. 3) corresponds to the distance between the guide 16 and the pivot axis 7. Accordingly the pivot axis 7 is located at the circle-origin of the guide 16.

In the arrangement of FIG. 1, the vertical longitudinal side 12 of the window wood 4 is mounted in such a manner that the window wood end is processed on that side by the saw 11 or the tenoning-and-mortising spindle 13. Accordingly the tools first produce the tip of the workpiece and only then sever the projecting part. Depending on the particular conditions such as type of wood, cutting rate etc., it may be appropriate to proceed reversely and to exchange the tools at the end of cutting in the tip zone. Other particulars again may require a cutting procedure as in FIG. 1.

Figure 2:
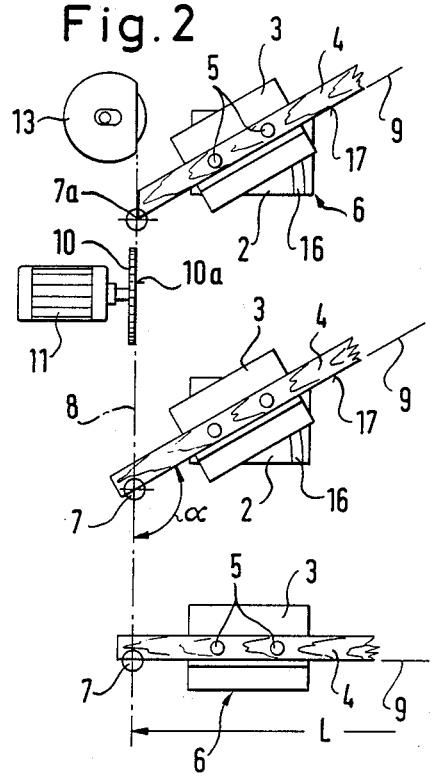
FIG. 2 is a schematic similar to FIG. 1 for another position of the workpiece being processed.

FIG. 2 shows how the machinery of the invention allows both. In the arrangement of FIG. 2, the angle α subtended by the planes 8 and 9 is larger than 90° and is located on the side 17 of the window wood 4 that is away from the tools. Here again the length L is controlled to be constant for any magnitude of the angle α.

Figure 3:
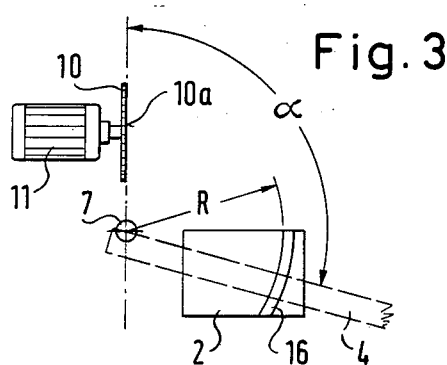
FIG. 3 is a schematic of the roller table of the invention with removed table plate.
Figure 4:
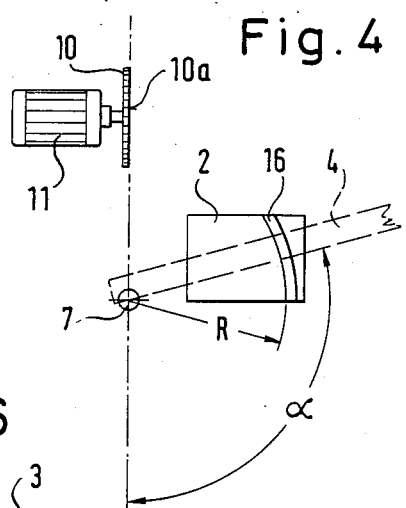
FIG. 4 is a schematic similar to FIG. 3 for another workpiece position.

FIG. 3 shows the roller carriage 2 when the table plate is removed, whereby the shape and mounting of the arcuate guide 16 is made clearer. For the remainder, this arrangement of FIG. 3 corresponds to that of FIG. 1. The same applies to FIG. 4 wherein the arrangement corresponds to that of FIG. 2.

Figure 5:
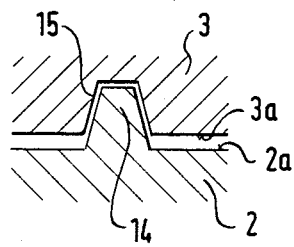
FIG. 5 is a cross-section of the guide between the table plate and the roller carriage.

FIG. 5 is a cutaway of an illustrative embodiment of the guide 16, in this case a trapezoidal guide means 14 being part of the roller carriage 2 and being engaged by a matching groove 15.

Figure 6:
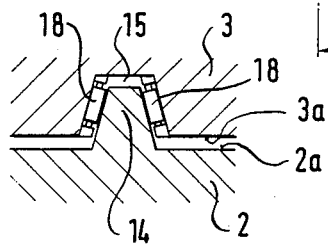
FIG. 6 is a cross-section similar to FIG. 5 for another embodiment.

FIG. 6 is a somewhat modified embodiment; herein cylinder needles 18 are placed between the two guide components 14 and 15 to permit low-friction displacement.

I claim:

1. A woodworking machine for a longitudinal workpiece, comprising:
   (a) at least one tenoning-and-mortising spindle,
   (b) at least one length cutting device comprising a vertically oriented saw blade;
   (c) a roller table which includes a roller carriage and a table pivotally mounted thereon, said roller carriage being spaced from said length cutting device and being mounted for movement parallel to a first plane defining the side of said saw blade facing said roller table;
   (d) means for mounting a workpiece to said table plate, a side of said workpiece defining a second plane which intersects said first plane;
   (e) the intersection of said planes defining a vertical pivot axis around which said table plate pivots; the intersection of said planes subtending an angle greater than 90° on a side of said first plane facing said roller table;
   (f) engagement means connecting said roller carriage and said table plate defining a given radius between said vertical axis and said engagement means.

2. The woodworking machine of claim 1, said engagement means comprising mutually facing sides of said table plate and of said roller carriage comprising mutually engaging components of an arcuate guide means.

3. The woodworking machine of claim 2, wherein said guide means comprise a trapezoidal cross-section component on said roller carriage which is engaged by a matched groove on said table plate.

4. The woodworking machine of claim 3, wherein roller bearings in the form of cylindrical needles are present in said groove.

5. The woodworking machine of claim 3, wherein segments of bearings displaceable toward said guide means are provided.

6. The woodworking machine of claim 4, wherein segments of bearings displaceable toward said guide means are provided.

* * * * *